United States Patent [19]

Polckemann

[11] Patent Number: 4,648,545
[45] Date of Patent: Mar. 10, 1987

[54] SOLDERING IRON

[76] Inventor: Birger H. Polckemann, 17, Midgårdsvej, DK-3000 Helsingor, Denmark

[21] Appl. No.: 753,962

[22] Filed: Jul. 11, 1985

[30] Foreign Application Priority Data

Jul. 24, 1984 [DK] Denmark .............................. 3626/84

[51] Int. Cl.$^4$ ............................ B23K 3/02; B23K 3/06
[52] U.S. Cl. ........................................ 228/53; 228/20; 228/52; 219/230
[58] Field of Search ....................... 228/52, 53, 55, 20; 219/229, 230

[56] References Cited

U.S. PATENT DOCUMENTS

| | | | |
|---|---|---|---|
| 1,893,093 | 1/1933 | Linville et al. | 219/230 |
| 2,689,901 | 9/1954 | Obolensky | 219/230 |
| 3,101,689 | 8/1963 | Hammond | 219/230 |
| 3,443,733 | 5/1969 | Parente | 219/230 |
| 3,707,258 | 12/1972 | Schlitt | 219/230 |
| 4,187,972 | 2/1980 | Vella | 228/55 |

FOREIGN PATENT DOCUMENTS

| | | | |
|---|---|---|---|
| 0119461 | 7/1983 | Japan | 228/52 |
| 322548 | 12/1929 | United Kingdom | 228/53 |
| 481669 | 3/1938 | United Kingdom | 219/230 |
| 1543594 | 4/1979 | United Kingdom . | |
| 1550217 | 8/1979 | United Kingdom . | |
| 2053761A | 2/1981 | United Kingdom | 219/230 |

Primary Examiner—Nicholas P. Godici
Assistant Examiner—Christopher L. McKee
Attorney, Agent, or Firm—Browdy and Neimark

[57] ABSTRACT

A soldering iron is provided of a type in which the solder is fed through the interior of the soldering iron to the tip, which is heated by a heating element in the soldering iron. In order to prevent the solder from melting before it reaches the tip, as a result of the heat transmitted from the heating element to the solder, the soldering iron is provided, e.g. on a feed tube for the solder, with an inlet for a coolant, e.g. water or air, which is made to flow through the interior of the soldering iron around the solder, thereby cooling the surroundings of the solder.

10 Claims, 2 Drawing Figures

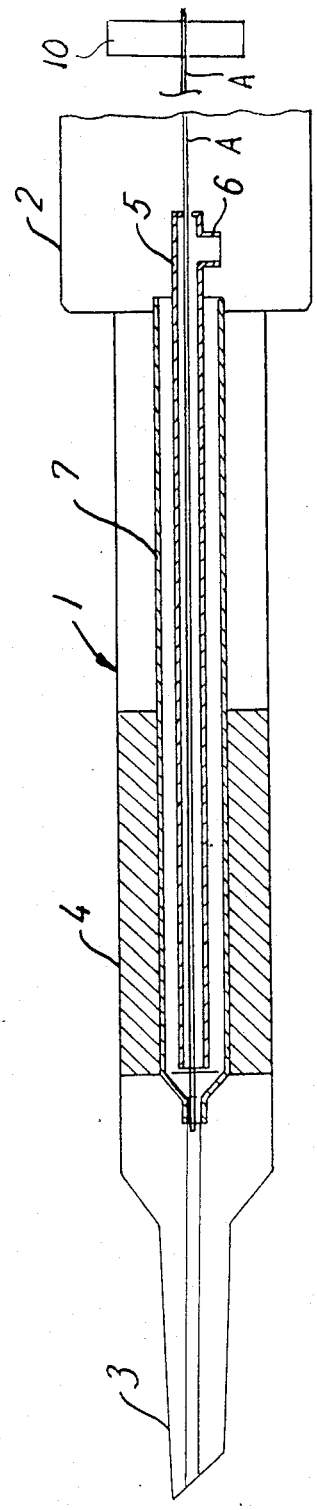
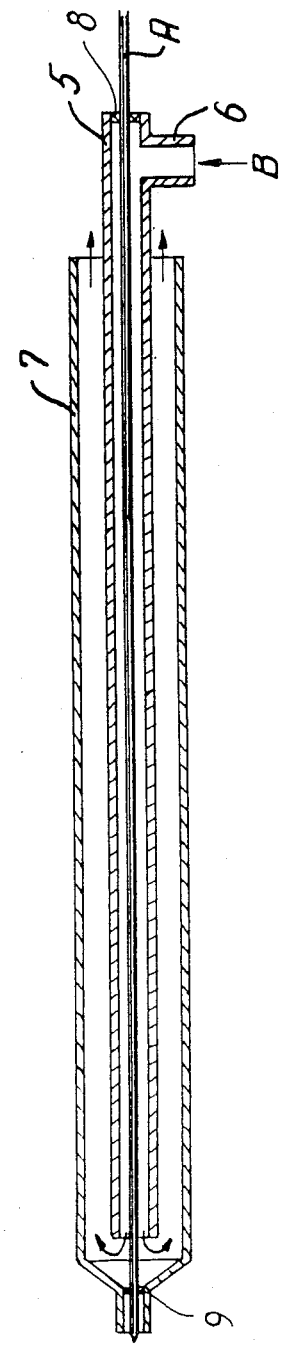
FIG.1
FIG.2

SOLDERING IRON

BACKGROUND OF THE INVENTION

The invention relates to a soldering iron of the type in which the solder is fed through the interior of the iron to the soldering tip, which is heated by a heating element in the soldering iron.

A problem with soldering irons of this type is that the heat from the heating element, which serves to heat the tip, spreads through the material of the soldering iron, thereby causing the solder to soften to an unwanted extent or even melt, before it reaches the tip of the iron, because the solder has a considerably lower melting-point than the material of which the iron itself is made. This affects the quality of the soldering process, and makes precise soldering difficult.

Attempts at eliminating this problem by means of insulating of the solder from the heating element have not been sufficiently efficient, because a sufficient insulation is not possible in the relatively small place which is available in a soldering iron. If, on the other hand, the soldering iron were to be bigger, in order to make sufficiently efficient thermal insulation of the solder from the heating element possible, the soldering iron would become less handy to operate.

SUMMARY OF THE INVENTION

The present invention has the purpose of preventing a premature melting of the solder in soldering irons without increasing the size of the soldering iron as a result of the use of space-demanding insulation means.

This is, according to the invention, achieved by means of a soldering iron of the aforementioned type, in which means are provided for supplying a coolant, cooling air for instance, said coolant flowing through the interior of the soldering iron around the solder, at least in the area which comprises the heating element.

Such a flow of coolant through the interior of the soldering iron, a flow which preferably surrounds the solder entirely, will have the effect that the areas surrounding the solder will be cooled down, and that the heat is, before it reaches the solder, led away to such an extent that the residual-heat does not influence the consistency of the solder, and by thus leading away the heat, instead of simply trying to keep it out by way of more or less voluminous insulation members, a premature melting of the solder is efficiently avoided without necessitating an increase of the overall dimensions of the soldering iron.

BRIEF DESCRIPTION OF THE DRAWING

In the following, the invention is explained in more details by way of an embodiment which is shown schematically on the drawing, on which FIG. 1 is a cross sectional view of the portion of a soldering iron which is comprised by the invention, whereas FIG. 2 is an enlarged view of a portion of the cross-sectional view of FIG. 1. in which the paths of the coolant and the solder are shown.

DETAILED DESCRIPTION

In FIG. 1 the soldering iron 1 is equipped with a handle 2, and at its opposite end it is terminated by a soldering tip 3. The tip is heated by way of a heating element 4, which is heat-conductively connected with the soldering tip 3.

The solder, in the shape of a solder wire A, is supplied from a not shown source to the right of FIG. 1, and it is fed such as by hand or a feeding means 10 within the interior of the soldering iron 1 through a tube 5 extending therein to the tip 3, where it is melted down in the conventional fashion. Thus, see FIG. 2 which shows the solder at A, and in which parts which correspond to those shown in FIG. 1 carry the same references.

On its path through the soldering iron 1, the solder passes through the area of the heating element 4, and in this area, after a relatively short time of operation, the temperature will be so high that the solder wire softens and thereafter melts if steps are not taken to prevent this.

Such steps, according to this invention, consist in conducting away of at least an essential part of the internally directed heat, before it is transmitted to the solder, and such a conducting away of the heat can, in a soldering iron according to the invention, as exemplified in FIGS. 1 and 2, be realized by a pipe stub 6 serving as a coolant inlet on the feed tube 5 which inlet is connected with a coolant supply (not shown), for instance cooling water or cooling air, e.g. supplied or blown from B as shown in FIG. 2. When coolant is thus introduced under pressure, i.e. forced, through the inlet 6, the coolant will flow to the left in FIG. 1. i.e. along the solder in direct contact with it, as shown by arrows in FIG. 2, and an efficient cooling of the feed tube 5 is achieved. At the orifice of the tube 5 to the left in FIG. 1, the coolant could, possibly, be ejected to the surroundings through the outer walls of the soldering iron, by way of openings not shown, but the tube 5 can, in an appropriate manner, be enclosed by an additional tube 7, which, to the left in FIGS. 1 and 2, communicates with the exit from the tube 5.

As shown in FIG. 2 the solder wire is at 8 and 9 led into the tube 5 and out of the tube 7 in a tightening manner, e.g. through a restricted opening. The tightening may for instance be obtained by means of diaphragms having a central hole the diameter of which is a little smaller than the diameter of the solder wire.

The tubes 5 and 7, which may be manufactured from stainless steel, are preferably reflecting, e.g. high-polished or chromium-plated on their outer side in order to reflect as much as possible of the incident infrared heat radiation. On their inner side said tubes may be rough, e.g. sandblasted, in order to increase the cooling surface.

As shown by the arrows in FIG. 2, the coolant after having left the tube 5, will flow back towards the coolant inlet on the outside of the tube 5, hereby achieving partly an additional cooling around the solder and its feed tube, partly an opportunity to eject the coolant close to the place of introduction thereof so that one double tube will be sufficient to introduce and eject the coolant. This further reduces the space demands of the soldering iron and makes it more handy.

I claim:

1. A soldering iron of the type in which the solder is fed through the interior of the iron to the soldering tip, which is heated by a heating element in the soldering iron, wherein means are provided for actively supplying a distinct coolant under pressure, said coolant flowing through the interior of the soldering iron around the solder, at least in the area which comprises the heating element.

2. A soldering iron of the type in which the solder is fed through the interior of the iron to the soldering tip, comprising:
- a body terminating in a tip, said body having a passageway therethrough for the feeding therethrough of solder in wire form, and heating means in said body for heating said tip;
- said body defining an internal cavity in the vicinity of said heating element through which cavity said wire solder moves; and
- said cavity having a coolant inlet and a coolant outlet, and means for forcing coolant under pressure through said coolant inlet, about the solder being fed, and out said coolant outlet.

3. A soldering iron according to claim 2, wherein said cavity comprises an elongated cylindrical pipe.

4. A soldering iron according to claim 3, wherein said coolant inlet is at the upstream end of said pipe relative to the movement of the wire solder therethrough, and said coolant outlet is at the downstream end of said pipe, whereby coolant flow is concurrent with movement of wire solder through said soldering iron.

5. A soldering iron according to claim 2, wherein said cavity comprises a pair of concentric cylindrical pipes with an annular space therebetween.

6. A soldering iron according to claim 5, wherein said coolant inlet is at the upstream end, relative to the direction of movement of wire solder, of the innermost of said concentric pipes, and said coolant outlet is at the upstream end of the outermost of said concentric pipes, the innermost of said concentric pipes opening to the outermost of said concentric pipes at their respective downstream ends.

7. A soldering iron according to claim 3, wherein said elongated cylindrical pipe has a reflective outer surface.

8. A soldering iron according to claim 3, wherein said elongated pipe has a roughened interior surface.

9. Soldering iron of the type in which the solder is fed through the interior of the iron to the soldering tip, which is heated by a heating element in the soldering iron, wherein means are provided for supplying a coolant, said coolant flowing through the interior of the soldering iron around the solder, at least in the area which comprises the heating element, having a feed tube for the solder, wherein the feed tube as seen in the direction of feed of the solder has in front of the heating element an inlet for the coolant and beyond the heating element an outlet for the coolant.

10. Soldering iron as claimed in claim 9, wherein the feed tube extends within a second tube or channel, into which the coolant outlet of the feed tube opens, and which itself is provided with a coolant outlet in front of the heating element.

* * * * *